(12) United States Patent
Testar et al.

(10) Patent No.: US 10,247,809 B2
(45) Date of Patent: Apr. 2, 2019

(54) METHOD FOR OPERATING A HANDHELD SCREENING DEVICE AND A HANDHELD SCREENING DEVICE

(71) Applicant: SONY CORPORATION, Tokyo (JP)

(72) Inventors: Miquel Testar, Stuttgart (DE); Furkan Dayi, Stuttgart (DE); Ralf Boehnke, Esslingen (DE); Marcel Blech, Herrenberg (DE); Qi Wang, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 209 days.

(21) Appl. No.: 14/438,782

(22) PCT Filed: Oct. 9, 2013

(86) PCT No.: PCT/EP2013/003037
§ 371 (c)(1),
(2) Date: Apr. 27, 2015

(87) PCT Pub. No.: WO2014/094928
PCT Pub. Date: Jun. 26, 2014

(65) Prior Publication Data
US 2015/0285898 A1    Oct. 8, 2015

(30) Foreign Application Priority Data
Dec. 19, 2012 (EP) .................................. 12008451

(51) Int. Cl.
*G01S 7/02* (2006.01)
*G01V 8/00* (2006.01)
(Continued)

(52) U.S. Cl.
CPC .............. *G01S 7/02* (2013.01); *G01S 7/4008* (2013.01); *G01S 13/08* (2013.01); *G01S 13/887* (2013.01);
(Continued)

(58) Field of Classification Search
CPC ........ G01S 13/888; G01S 13/887; G01S 13/89
(Continued)

(56) References Cited

U.S. PATENT DOCUMENTS 6,359,582 B1 *   3/2002   MacAleese ............. G01S 7/417
                                                    342/192
6,417,797 B1 *   7/2002   Cousins ................... G06F 15/02
                                                    342/175

(Continued)

OTHER PUBLICATIONS

Combined Chinese Office Action and Search Report dated Aug. 3, 2016 in Patent Application No. 201380067150.8 (with English translation of categories of cited documents).
(Continued)

*Primary Examiner* — Marcus E Windrich
(74) *Attorney, Agent, or Firm* — Xsensus LLP

(57) ABSTRACT

A handheld screening device including: an antenna array including a plurality of antennas; an input mechanism to select an operation mode; and a controller to determine a group of antennas of the plurality of antennas, wherein the number of antennas in the group is based on the selected operation mode, and to control the group of antennas to emit electromagnetic waves. A corresponding method operates the handheld screening device.

15 Claims, 10 Drawing Sheets

(51) Int. Cl.
  *G01S 13/88*    (2006.01)
  *H01Q 19/08*    (2006.01)
  *H01Q 21/06*    (2006.01)
  *G01S 7/40*     (2006.01)
  *G01S 13/08*    (2006.01)
  *G01S 13/89*    (2006.01)
  *G01V 3/15*     (2006.01)

(52) U.S. Cl.
  CPC .............. *G01S 13/89* (2013.01); *G01V 8/005* (2013.01); *H01Q 19/08* (2013.01); *H01Q 21/061* (2013.01); *G01S 2007/4013* (2013.01); *G01V 3/15* (2013.01)

(58) Field of Classification Search
  USPC ........................................ 342/22, 176, 191
  See application file for complete search history.

(56) References Cited

U.S. PATENT DOCUMENTS

| | | | |
|---|---|---|---|
| 7,209,035 | B2 | 4/2007 | Tabankin et al. |
| 7,724,180 | B2* | 5/2010 | Yonak .................... G01S 13/931 342/70 |
| 8,068,049 | B2 | 11/2011 | Salmon et al. |
| 8,791,851 | B2* | 7/2014 | Elad ...................... G01S 13/867 342/22 |
| 2003/0164791 | A1* | 9/2003 | Shinoda .............. G01S 13/4463 342/70 |
| 2004/0214598 | A1 | 10/2004 | Parameswaran Rajamma |
| 2005/0231421 | A1 | 10/2005 | Fleisher et al. |
| 2007/0139249 | A1* | 6/2007 | Baharav .................. G01S 13/89 342/22 |
| 2009/0167593 | A1* | 7/2009 | Storz ......................... G01S 7/24 342/133 |
| 2009/0195435 | A1 | 8/2009 | Kapilevich et al. |
| 2009/0295618 | A1* | 12/2009 | Beeri .................... G01S 13/888 342/22 |
| 2010/0052971 | A1* | 3/2010 | Amarillas ............ G01S 13/885 342/22 |
| 2010/0117885 | A1* | 5/2010 | Holbrook ............... H04N 1/107 342/22 |
| 2010/0302240 | A1* | 12/2010 | Lettvin .................. G01S 3/784 345/419 |
| 2011/0227778 | A1* | 9/2011 | Mohamadi ........... G01S 13/888 342/22 |
| 2012/0299773 | A1 | 11/2012 | Stirling-Gallacher et al. |
| 2013/0113648 | A1* | 5/2013 | Duvoisin, III ........ G01S 13/887 342/22 |
| 2015/0301167 | A1* | 10/2015 | Sentelle ............... A61B 5/0205 342/22 |

OTHER PUBLICATIONS

Luna Innovations Incorporated, "Weapons and Non-permitted Devices Detector (WANDD)," NCJRS Document No. 228732, DOJ Award No. 2006-IJ-CX-K023 Final Report, Jul. 31, 2008, 48 pages.

International Search Report dated Dec. 20, 2013 in PCT/EP2013/003037 filed Oct. 9, 2013.

* cited by examiner

| Parameters \ Modes | Low Power | Standard | High performance | High throughput | Single antenna | Binary |
|---|---|---|---|---|---|---|
| Tx power | Reduce to minimum specified SNR | Default Tx power High power stage: OFF | Default Tx power High power stage: ON | Default Tx power High power stage: ON | Reduced | Any |
| Chirp period / step size | Reduce to minimum SNR / Unambiguous range | Reduce to minimum SNR / Unambiguous range | Reduce to minimum SNR / Unambiguous range | Reduce to minimum SNR / Unambiguous range | CW | Any |
| # Chirps | 1 | 1 | Multiple. Adapt to maximum measurement time allowed | 1 | ? | 1 |
| Antenna array | Underdetermined | Optimal | Overdetermined | Underdetermined (reduce #Tx) | Single | Any |
| Display | LED / Sound | Screen / Goggles | Screen / Goggles | Screen / Goggles | Level Bar | LED / Sound |
| Spatial granularity | Adapt to minimum object size | Default | Finest | Adapt to minimum object size | ? | Any |
| # layers processed | Single / Dominant | Default # layers around the dominant | All layers | Single / Dominant | ? | Any |
| Reconstruction algorithm | Frequency domain | Frequency domain | Time domain | Frequency domain | Power detection only | Any |
| Further processing need | No | No | Object pre-selection: Shape detection and match with DBB Material pre-selection: Match reflectivities with DBB | Automatic target recognition | No | Automatic target recognition |

FIG 7

| Parameters / Performance | Resolution | Robustness | Speed | Power consumption |
|---|---|---|---|---|
| Tx Power ↑ | | ↑ | | ↑ |
| IF Amplification ↑ | | ↑ | | ↑ |
| Chirp period / Step size ↑ | | ↑ | → | ↑ |
| # Chirps ↑ | ↑ | ↑ | → | ↑ |
| Antenna complexity ↑ | ↑ | | → | ↑ |
| Contrast of display ↑ | ↑ | | | |
| Bandwidth ↑ | ↑ | | → | ↑ |
| | Hardware | | | |
| Spatial granularity ↑ | ↑ | ↑ | → | ↑ |
| # layers processed ↑ | ↑ | ↑ | → | ↑ |
| Computational intensity of the algorithm used ↑ | | ↑ | → | |
| Samples processed ↑ | | ↑ | → | ↑ |
| | Software | | | |

FIG 8

METHOD FOR OPERATING A HANDHELD SCREENING DEVICE AND A HANDHELD SCREENING DEVICE

CROSS-REFERENCE TO RELATED APPLICATIONS

The present application is based on PCT/EP2013/003037 filed Oct. 29, 2013 and claims priority to European Patent Application 12008451.2, filed in the European Patent Office on 19 Dec. 2012, the entire contents of each of which being incorporated herein by reference.

BACKGROUND

Field of the Disclosure

The present disclosure relates to a method for operating a handheld screening device and a handheld screening device.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A variety of conventional systems are available for obtaining images through visibly opaque materials. For example, X-ray systems have been utilized to acquire images of objects that are hidden from visual inspection by visibly opaque materials (e.g., anatomical structures or objects within a luggage). X-ray systems, however, have many disadvantages. By way of example, such systems can be expensive and bulky, and can utilize ionizing radiation that may pose health hazards to humans. Moreover, X-ray systems typically detect a beam that has been transmitted through a target sample, thus requiring access to both sides of the target. Ultrasound imaging systems, in turn, require the presence of a continuous, high quality acoustic transmission path between a transducer and a "hidden" object of interest. In many cases, however, such acoustic transmission paths may be not available.

Millimeter-wave imaging systems have recently been developed for securing screening applications. Millimeter-waves are particular useful for detecting objects in an active radar system, i.e. by emitting electromagnetic waves in the millimeter-wavelength region and detecting reflected or scattered electromagnetic waves.

There is a need to further improve the usability of handheld screening apparatus based on millimeter-wave imaging systems.

SUMMARY

A handheld screening device is provided comprising an antenna array including a plurality of antennas; an input mechanism to select an operation mode; and a controller to determine a group of antennas of the plurality of antennas, wherein the number of antennas in said group is based on the selected operation mode, and to control the group of antennas to emit or to receive electromagnetic waves.

Further, a method for operating a handheld screening device that includes an antenna array with a plurality of antennas to emit electromagnetic waves is provided, the method comprising selecting an operation mode, determining a group of antennas of the plurality of antennas, wherein the number of antennas in said group is based on the selected operation mode, emitting electromagnetic waves from the determined group of antennas or receiving electromagnetic waves from the determined group of antennas.

Further, a handheld screening device is provided including: an input mechanism to select an operation mode; a controller to determine a number of distances between the handheld screening device and one or more objects based on the selected operation mode; and at least one antenna to emit electromagnetic waves and to detect electromagnetic signals reflected from the one or more objects located at the determined distances.

Further, a method for operating a handheld screening device is provided, the method comprising selecting an operation mode; emitting electromagnetic waves from an antenna of the handheld screening device; detecting electromagnetic signals reflected from one or more objects located at one or more distances from the antenna, wherein a number of the distances is based on the selected operation mode.

The foregoing paragraphs have been provided by way of general introduction, and are not intended to limit the scope of the following claims. The described embodiments, together with further advantages, will be best understood by reference to the following detailed description taken in conjunction with the accompanying drawings. The elements of the drawings are not necessarily to scale relative to each other.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 7 shows an exemplary table summarizing the parameters for different operation modes according to an embodiment of the invention.

FIG. 8 shows an exemplary table summarizing the effects of different parameters on the performance of a handheld screening device.

DESCRIPTION OF THE EMBODIMENTS

Figure 1:
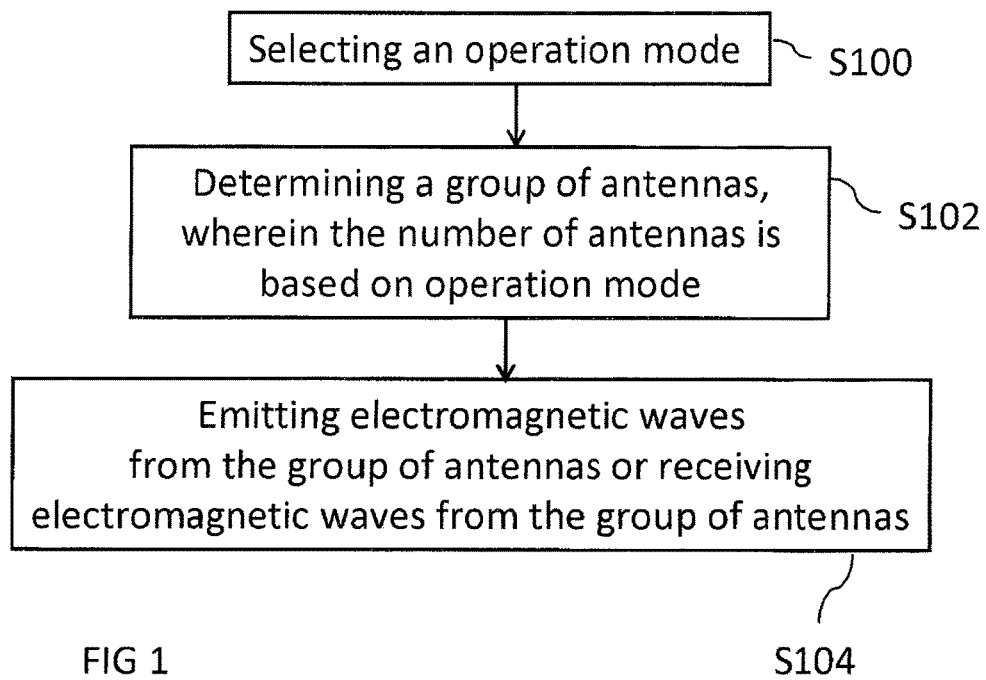
FIG. 1 shows schematically method steps according to an embodiment of the invention.

Referring now to the drawings, wherein like reference numerals designate identical or corresponding parts throughout the several views, FIG. 1 depicts steps of a method for operating a handheld screening device.

In step S100 an operation mode of a handheld screening device is selected.

Figure 2:
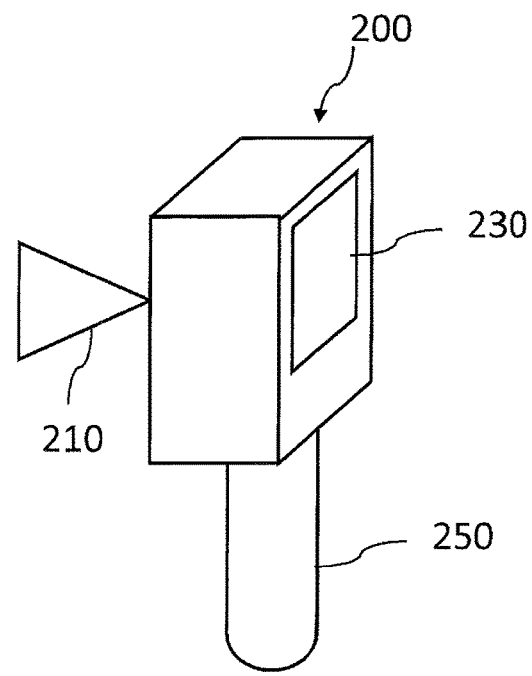
FIG. 2 shows schematically a perspective view of a handheld screening device according to an embodiment of the invention.
Figure 3:
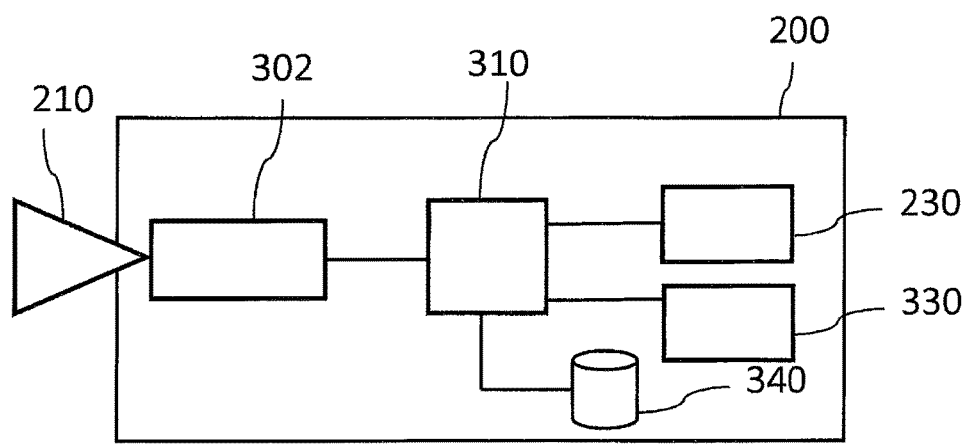
FIG. 3 shows schematically a block diagram of a handheld screening device according to an embodiment of the invention.

An example for a handheld screening device 200 is depicted in FIG. 2 in a perspective view and in FIG. 3 as a schematic block diagram.

The term "handheld" used throughout the description might be understood to describe a device that can be carried (i.e. it is mobile) and operated by one or two hands and has preferably a weight less than 3 kg. A "handheld" device should approximately have geometrical dimensions (height, width, length) and weight as objects that are normally operated and/or carried by a person using one hand or two hands. Examples for such objects are a book, a smart phone, a cellular phone, an electronic reader, a tablet computer, a notebook computer, a stand still camera, a video camera, binoculars etc. Nevertheless, it should be understood that the device itself might be suited to be handheld, but in a particular application is mounted on a tripod or is otherwise fixed to a support when a stationary use of the device is envisaged.

The handheld screening device 200 includes an active radar scan unit 302 adapted to emit a radar signal and to receive reflected radar signals. The electromagnetic radiation or radar signals might be emitted in a cone form 210. A processor 310 is included into the handheld screening device, which controls the active radar scan unit 302.

The handheld screening device 200 might further include a display 230 or screen to display an active radar image.

An active radar scan can be taken e.g. by an active millimeter-wave sensor or scan unit or a radar scan sensor or radar scan unit. The active radar scan is generated by emitting electromagnetic waves in an extended mm-wavelength region from a radar source, e.g. a handheld screening device or an active radar scan unit to an object and detecting electromagnetic waves reflected or scattered from the object. "Detecting" might include capturing of the scattered electromagnetic waves by an antenna and radio frequency electronics followed by analogue-to-digital conversion and digital processing and analysis. The frequency of the millimeter wavelength region radiation is considered to be within 10 GHz to 500 GHz.

In order to get a one- or two-dimensional image, a position of the radar source (and of a capture unit for reflected or scattered electromagnetic waves) should be moved with respect to a position of the object. For instance, it is possible to move the radar source in order to change its position. A further possibility is changing the emission direction of the radar electromagnetic wave e.g. by a moving reflector, grating or some electronic beamforming means.

A grip 250 is provided so that a user can hold the handheld screening device 200 with one hand and can operate it easily.

An input mechanism 330 might be provided allowing the user to select an operation mode of the handheld screening device 200. The input mechanism might include a mouse, a touch screen, a keyboard, a track-ball or any other known input mechanism.

Further, the handheld screening device 200 might include a database or storage unit 340.

The active radar scan unit 302 includes an array of antennas adapted to emit electromagnetic radiation, e.g. millimeter waves.

The handheld screening device 200 can be used in a security check environment in order to check objects. The object can be any object that should be searched for, for instance hazardous or dangerous devices, as e.g. arms like pistols, guns, knives, etc. or other devices with a characteristic shape, e.g. bottles with liquids. Of course, the method can be equally applied to search for other devices that can be hidden. The objects can include human beings wearing clothes, suitcases or boxes or any other object that can be used to hide a device as described hereinbefore. Whereas it should be understood that the devices might be searched for due to security reasons (i.e. weapons, dangerous items), it is equally well possible that the devices should be identified due to other reasons, for instance, an organizer of a festival is searching for bottles of liquids (as an 'unwanted item' in this scenario), since he wants to forbid bringing such bottles into the festival, because he wants to sell his own products.

In a step S102 a group of antennas of the plurality of antennas is determined, wherein the number of antennas in said group is based on the selected operation mode.

In step S104 electromagnetic waves are emitted from the antennas in the group of antennas determined in S102 or electromagnetic waves are received by the antennas in the group of antennas determined in S102.

In the processor 310 an image is generated based on signals reflected from the object. The image might be formed as a pixel-matrix with a luminosity value and optionally a chromaticity value for each pixel of the pixel-matrix.

The term "image" as used throughout the description includes any information (reflectivity, depth, shape, contours, polarimetric scattering, polarization change etc.) that can be derived from evaluating the reflected or scattered electromagnetic waves.

Figure 4:
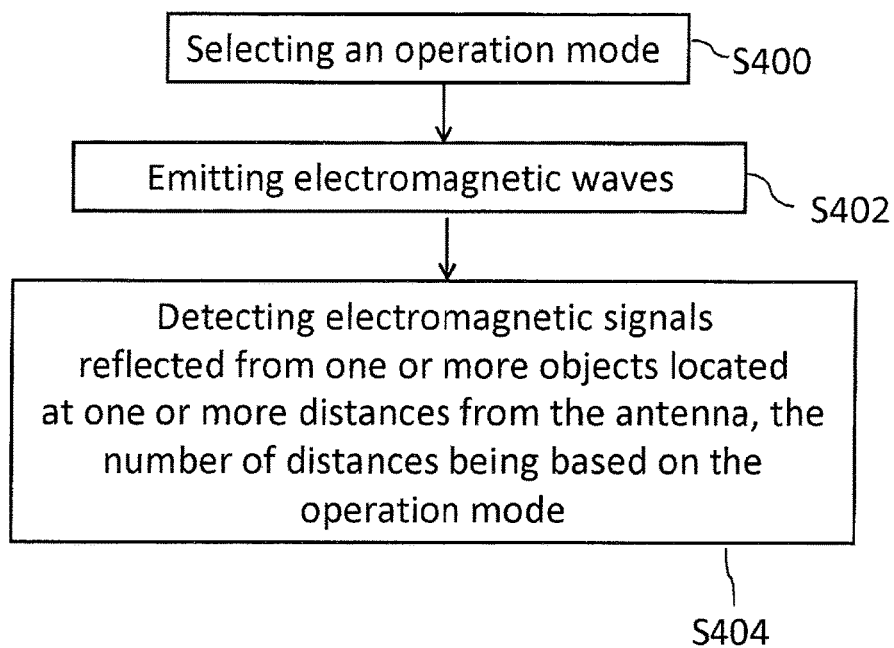
FIG. 4 shows schematically method steps according to a further embodiment of the invention.

In FIG. 4 method steps of a further embodiment of the invention are depicted. In a step S400 an operation mode is selected. Electromagnetic waves are emitted in S402. In step S404 electromagnetic signals are detected, which are reflected from one or more objects located at one or more distances from the antenna, wherein the number of distances is based on the selected operation mode.

Figure 5:
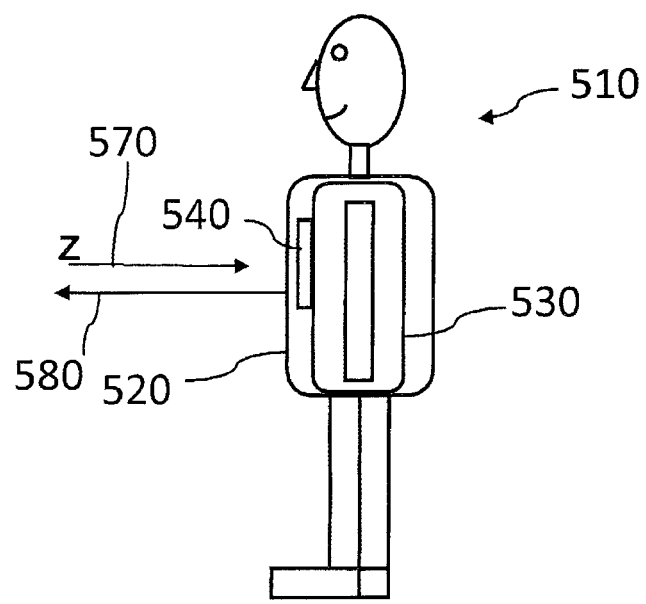
FIG. 5 shows schematically how an active radar image of a person is taken.
Figure 6:
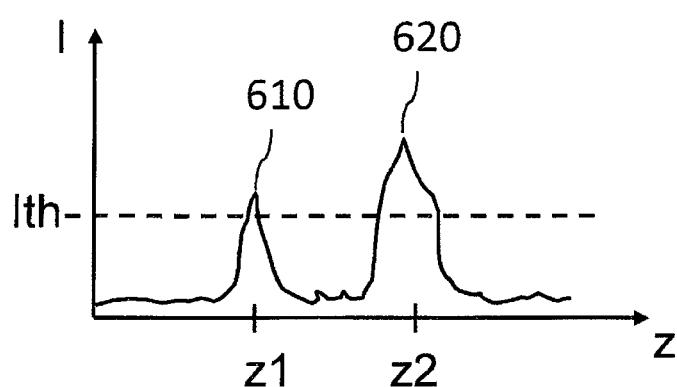
FIG. 6 shows schematically a reflected intensity as a function of distance between the handheld screening device and an object.

In FIGS. 5 and 6 it is schematically depicted how the image is selected among a sequence of images obtained from a plurality of distances, if the numbers of distances should e.g. be reduced to one.

In FIG. 5 a person 510 is depicted as an example for an object that should be investigated by the handheld screening device 200. The person 510 wears some clothes 520 above his body 530. In the example the person 510 tries to hide a device, e.g. a gun 540 between his body 530 and his clothes 520.

When radar signals 570 are directed in a z-direction towards the person 510, a fraction 580 of the radar signals is reflected and detected by the handheld screening device 200.

In FIG. 6 the reflected signal intensity I (e.g. a mean value of the image values or a summed value) is depicted versus the z-direction. As can be observed, the signal intensity includes a first relative maximum 610 at a first position z1 and a second relative maximum 620 at a second position z2.

According to an embodiment the first relative maximum 610 is detected by evaluating at which z-position the intensity I is above a predetermined threshold value Ith. Of course, the predetermined threshold value Ith might be a threshold value stored in the storage unit 340 or might be input via the input mechanism 330. The first relative maximum 610 is determined and the image or layer corresponding to the first relative maximum 610 is displayed on the display 230 in a "first layer" mode.

According to a further embodiment the second relative maximum 620 corresponds also to an absolute maximum of reflected intensity or reflectivity. Consequently, the image corresponding of the sequence of images corresponding to the second position z2 can be determined by evaluating the summed intensities of the different images or layers and can be displayed on the display 230 in a "highest reflectivity layer" mode.

Both modes, i.e. the "first layer mode" or the "highest reflectivity layer" mode can be used to identify hidden objects, as e.g. the gun 540 depicted in FIG. 5. For the example with the gun 540, considering that a gun made of metal normally has a very high reflectivity for radar waves, it would be appropriate to select the layer with the highest reflectivity to be displayed in order to find the gun in a security application scenario.

In the table in FIG. 7 a plurality of modes is depicted, i.e. a low power mode, a standard mode, a high performance mode, a high throughput mode, a single antenna mode, and a binary mode. For each mode different parameters are depicted that are used when the corresponding operation mode is selected by the input mechanism 330.

For a low power mode the transmission power of the antennas is reduced to a minimum as specified by a signal to noise ratio (SNR). The number of chirps used and the chirp period is reduced to a minimum depending on the signal to noise ratio SNR in case an FMCW (frequency-modulated continuous-wave) mode is used or the unambiguous range in case of a stepped modulation is used. The number of chirps is equal to one. The antenna array is underdetermined, whereas the term 'underdetermined' expresses the absolute spacing between the antenna elements (or virtual antenna elements in the case of a sparse MIMO topology) is significantly larger than half a wavelength. Similarly the term overdetermined describes an inter-element spacing significantly smaller than half a wavelength The number of antennas is reduced as shown in FIGS. 9 to 12. Either the unambiguous range of the field of view can be reduced or the resolution of the image can be reduced or both.

Figure 9:
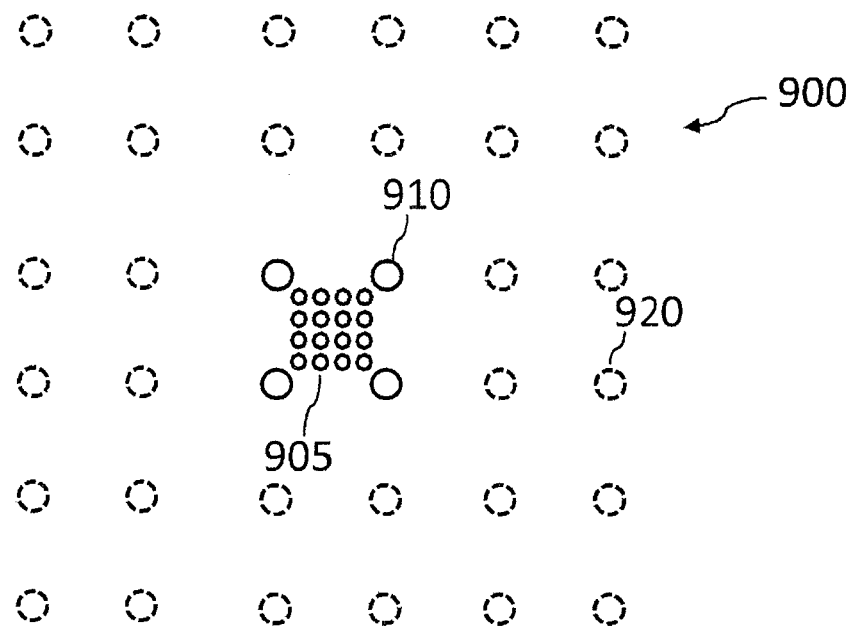
FIG. 9 shows a schematic diagram for an antenna array according to an embodiment of the invention.

FIG. 9 shows an antenna array 900 of a 2D MIMO (two-dimensional multiple input-multiple output) configuration. The small circles 900 indicate TX (transmission) or RX (reception) antennas, whereas the big circles 910 stand for RX or TX antennas.

The effective aperture is computed by the 2D convolution of the TX and RX elements. The size of this effective aperture can be increased by switching on further elements 920 (dashed). In this case only antennas of one type are switched on additionally. Increasing the aperture improves the resolution of the image and increases the field of view (due to catching more specular reflections).

Figure 10:
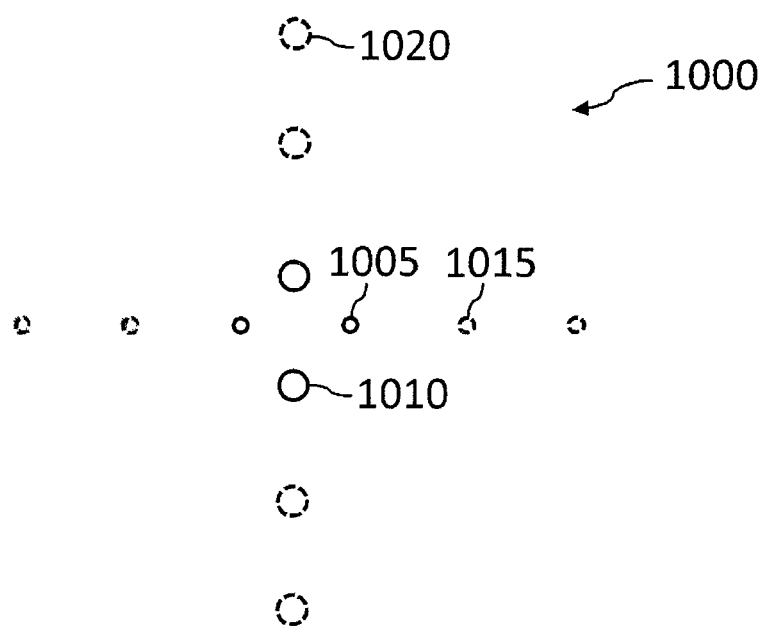
FIG. 10 shows a schematic diagram for an antenna array according to a further embodiment of the invention.

FIG. 10 shows a further antenna array 1000 of a 2D MIMO configuration. The small circles 1005 indicate TX or RX antennas, whereas the big circles 1010 stand for RX or TX antennas. The effective aperture is computed by the two-dimensional (2D) convolution of the TX and RX elements. The size of this effective aperture can be increased by switching on the further elements 1015, 1020 (dashed). In this case antennas 1015, 1020 of both types are switched on additionally. Increasing the aperture improves the resolution of the image and increases the field of view (due to catching more specular reflections). Additional antenna configurations for 2D MIMO can be e.g. X-shape, T-shape, H-shape, square-shape or even others. Those are well-known configurations extensively described in literature.

Figure 11:
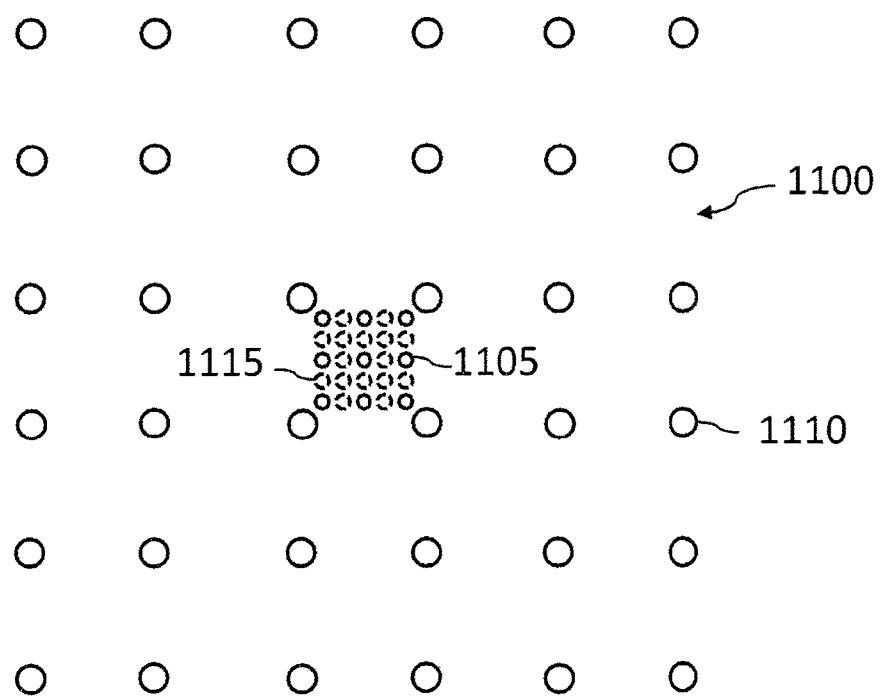
FIG. 11 shows a schematic diagram for an antenna array according to a further embodiment of the invention.

FIG. 11 shows a further antenna array 1100 of a 2D MIMO configuration. The small circles 1105 indicate TX or RX antennas, whereas the big circles 1110 stand for RX or TX antennas. The effective aperture is computed by the 2D convolution of the TX and RX elements. The inter element spacing of this effective aperture can be decreased by switching on the further elements 1115 (dashed). In this case only antennas of one type are switched on additionally. Decreasing inter element spacing of the aperture increases the spacing of the grating lobes (which causes unwanted aliasing) and increases the field of view (due to increasing the unambiguous angular range).

Figure 12:
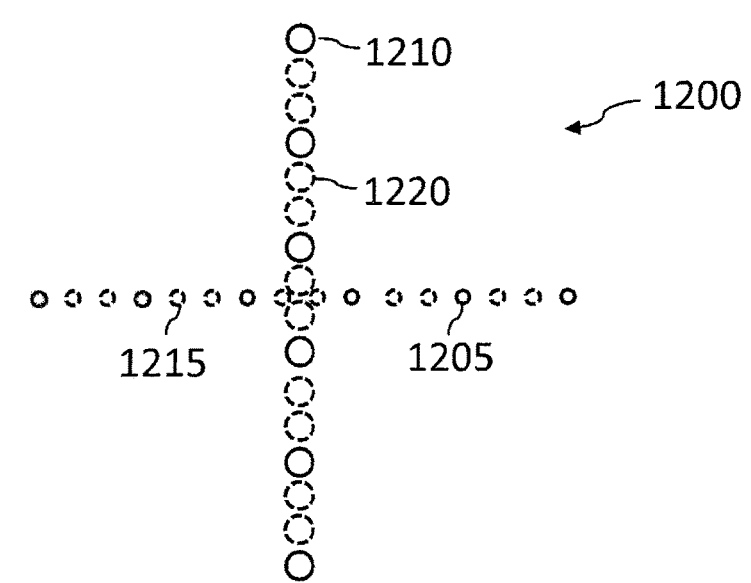
FIG. 12 shows a schematic diagram for an antenna array according to a further embodiment of the invention.

FIG. 12 shows a further embodiment of an antenna array 1200 of a 2D MIMO configuration. The small circles 1205 indicate TX or RX antennas, whereas the big circles 1210 stand for RX or TX antennas. The effective aperture is computed by the 2D convolution of the TX and RX elements. The inter element spacing of this effective aperture can be decreased by switching on further elements 1205, 1215 (dashed). In this case only antennas of one type are switched on additionally. Decreasing inter element spacing of the aperture increases the spacing of the grating lobes (which causes unwanted aliasing) and increases the field of view (due to increasing the unambiguous angular range). Additional antenna configurations for 2D MIMO can be e.g. X-shape, T-shape, H-shape, square-shape. Those are well-known configurations widely described in literature. Both methods of increasing the aperture and decreasing the inter element spacing can be combined.

The algorithm used has relatively low complexity in order to minimize the number of operations, the spatial granularity is coarse and adapted to the size of the smallest object intended to be detected, only the layer dominant in reflectivity is processed, and a frequency domain reconstruction algorithm is used.

For a high performance mode the transmit (Tx) power is increased to the maximum, a high power is enabled, consisting an additional amplification stage in transmission. Both the chirp period and the number of chirps are increased to allow a higher SNR and more reliable detection. The antenna array is over determined, the spare Tx/Rx combinations are used to reduce the probability of outlier presence and detect variation in the scenario during the scan. The complexity of the algorithm is high by using fine algorithm granularity, in order to have a better accuracy and resolution of the obtained image, all layers being processed, in order to avoid the non-processing of a relevant layer, a high-performing time-domain reconstruction algorithm is used in order to allow a more accurate detection. In this high performance mode some object and/or material pre-selection is applied by matching the shape and the reflectivities, respectively, with a database.

This mode allows a fine and robust detection, the drawback is lower speed and higher power consumption.

The high throughput mode favors the speed of the detection, in this mode the antenna array is underdetermined to reduce the number of samples to be processed. The algorithm used is of low complexity in this case, the spatial granularity is coarse and adapted to the size of the smallest object intended to be detected, only the layer dominant in reflectivity is processed, and a fast frequency domain reconstruction algorithm is used. Furthermore automatic target detection is applied in order to reduce the time needed by the operator to decide whether there is some hazardous object in the inspected area.

The binary mode gives a binary information to the operator being either OK (no hazardous object was detect), or not-OK (a hazardous object was detected). This mode can be used for any configuration of the antenna array and complexity of the algorithm applied and is best suited when the device is used by a non-skilled operator.

The standard mode balances the resolution, the robustness, the speed and the power consumption to the mostly expected scenario. The TX power and the chirp period are kept above the minimum accepted values, by the SNR in case of a FMCW modulation or the unambiguous range in case a stepped modulation is used. An optimal antenna array, in terms of resolution and field of view, is used. The granularity of the reconstruction algorithm is kept at default operation mode, well below the size of the smallest object to be detected. A determined number of layers around the dominant of reflectivity are processed and a frequency domain reconstruction algorithm can be used.

There is also a 1-antenna mode, in which only a single antenna element (of the MIMO array or an additional one) is used as TX/RX feed to a large antenna aperture. An arrangement for a 1-antenna mode is depicted in FIG. 13.

Figure 13A:
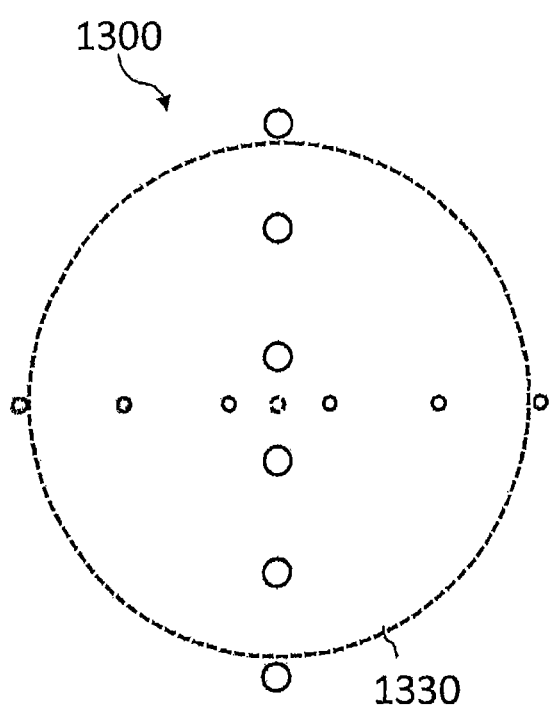
FIG. 13A shows a top view of an antenna array according to a further embodiment of the invention.

FIG. 13A shows the top view of an antenna array 1300 of a 2D MIMO configuration. In the 1-antenna mode, a large horn aperture 1310 or a large lens 1320 is manually attached to a center antenna. This is indicated by the dashed line showing the aperture 1330 of the large single antenna. This center antenna can be an additional antenna element or an antenna element of the array configuration, which is operated in TX/RX mode in the 1-antenna mode. All other elements of the MIMO array are switched off in the 1-antenna mode.

Figure 13B:
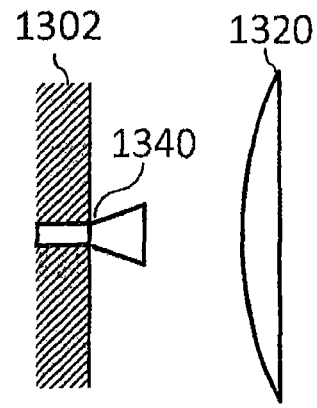
FIG. 13B shows a side view of a scan unit according to an embodiment of the invention.
Figure 13C:
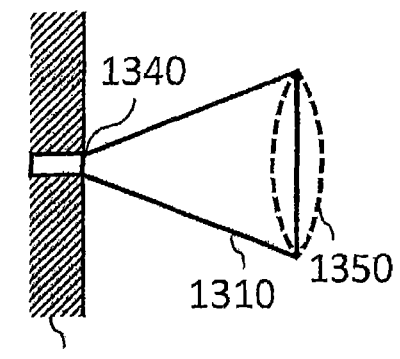
FIG. 13C shows a side view of a scan unit according to a further embodiment of the invention.

In FIG. 13B, which is the side view of a housing 1302 of a scan unit or sensor, the lens 1320 is placed on top of the center antenna 1340. The lens 1320 can be focusing or non-focusing. Alternatively a large horn antenna 1310 or a large horn-lens antenna can be attached to the center antenna 1340. This is shown in FIG. 13C. The dashed lines indicate an optional lens 1350, which is placed in the aperture of the large horn 1310. In the 1-antenna mode the scan unit scans only a single spot. This mode can indicate a high reflectivity at a single spot as e.g. caused by a metal gun.

In case of using an additional lens, it can be mechanically fixed to the housing by an adapter, which carries the lens. The adapter is configured to have a low radar cross section. Generally, a housing on top of the antenna array is not desirable due to electromagnetic interference. In case of attaching a large horn aperture to a small horn, this can be achieved by mechanically connecting a large funnel, e.g. by screwing it to a small horn antenna.

The large number of selectable operation modes provides a large flexibility for the operator, who may choose the optimal operation mode e.g. with regard to power consumption or resolution according to his resources (e.g. available power, time) and needs (e.g. high or low resolution).

FIG. 8 depicts the influence of the parameters on the resolution, the robustness, the speed and the power consumption of the active radar image generation in the handheld screening device 200.

In particular, the resolution is increased, when increasing the antenna complexity, when increasing the bandwidth, when increasing spatial granularity, or when increasing the computational intensity of the algorithm used.

The robustness is increased when the transmission power is increased, when the IF (intermediate frequency) amplification is increased, when the chirp period/step size is increased, when the number of chirps is increased, when the antenna complexity is increased, when the spatial granularity is increased, when the number of layers processed is increased, when the computational intensity of the algorithm used is increased, or when the number of samples processed is increased.

The speed is decreased (possibly together with an increased LNA (low noise amplifier) biasing, an improved noise figure and better SNR) with increasing chirp period/step size, with increasing number of chirps, with increasing antenna complexity, with increasing bandwidth, with increasing spatial granularity, with increasing number of layers processed, with increasing computational intensity of the algorithm used, or with increasing number of samples processed.

The power consumption is increased with increasing transmission power, with increasing IF amplification, with increasing chirp period/step size, with increasing number of chirps, with increasing antenna complexity, with increasing contrast of the display, with increasing bandwidth, with increasing spatial granularity, with increasing number of layers processed, with increasing computational intensity of the algorithm used, or with increasing number of samples processed.

Figure 14A:
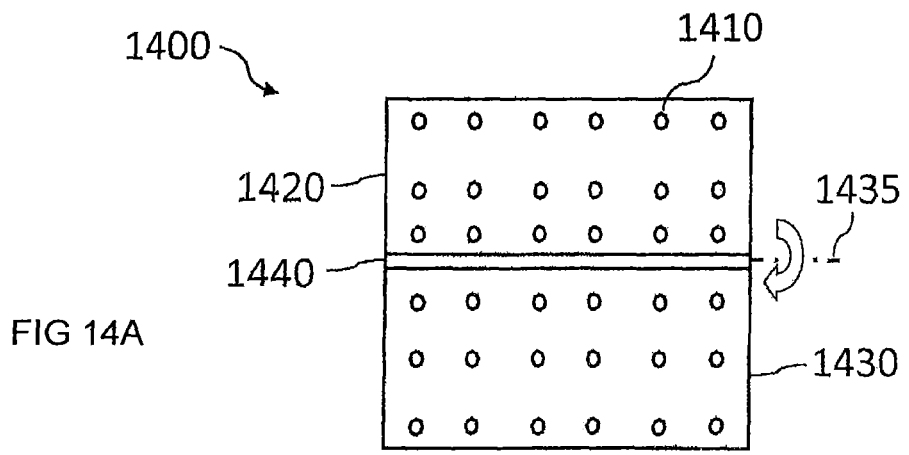
FIG. 14A shows a top view of a handheld screening device in an unfolded state according to a further embodiment of the invention.
Figure 14B:
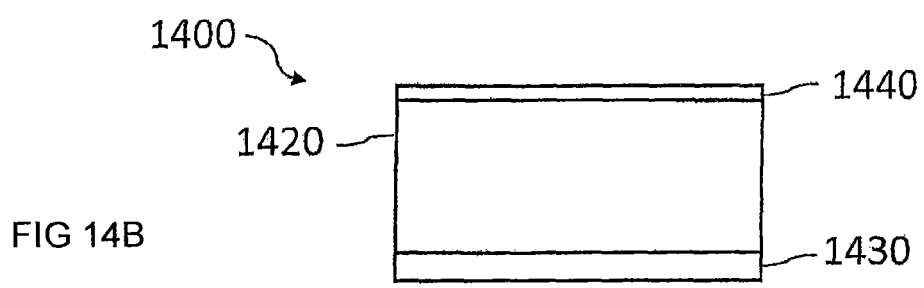
FIG. 14B shows a top view of a handheld screening device in a folded state according to a further embodiment of the invention.

In FIG. 14A a schematic view of a further embodiment of a handheld screening device 1400 is depicted. In order to decrease the size of the handheld screening device during transport, the antenna array 1410, which exemplarily is depicted in a square type format as discussed in connection with FIGS. 9 and 11, is divided so that a part of it is fixed to a first part 1420 of the handheld screening device 1400 and the other part is fixed to a second part 1430 of the handheld screening device. Both parts are connected by a hinge 1440. In operation, both parts are arranged in line as it is depicted in FIG. 14A. However, in order to transport the handheld screening device 1400 when it is not in use, it is possible to rotate or fold the second part 1430 about an axis 1435 arranged parallel to the hinge 1440. Afterwards the second part 1430 is arranged face-to-face with the first part 1420 as it is depicted in FIG. 14B. The area of the device 1400 in the folded state (FIG. 14*b*) (as observed perpendicular to the antenna array) can be reduced to approximately one half of the area of the unfolded state (as depicted in FIG. 14A). This configuration allows a high spatial resolution of the handheld screening device when operated (as the resolution is better for larger antenna apertures) while still providing at the same time the possibility for easily carrying the device or storing the device (i.e. in a bag) due to the smaller physical size when the device is not in use and the antenna aperture is folded away.

Of course it is possible to divide the antenna array 1410 in more than two parts that are connected by respective hinges.

Figure 14C:
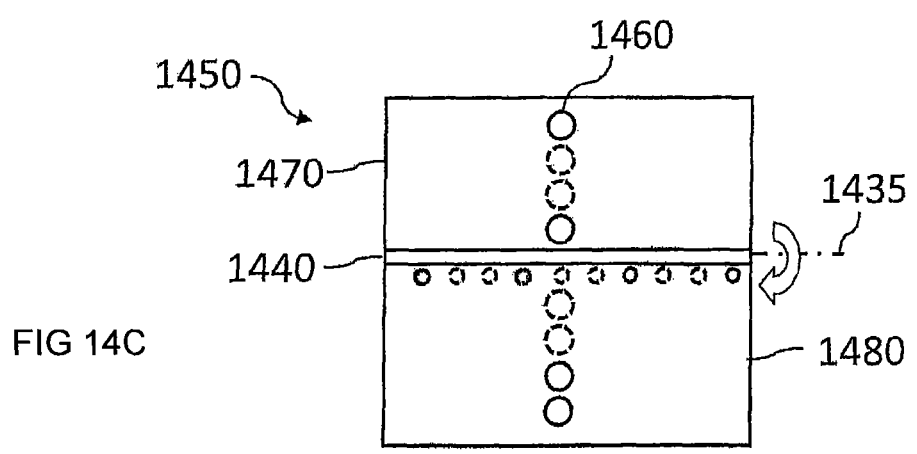
FIG. 14C shows a top view of a handheld screening device in an unfolded state according to a further embodiment of the invention.

As it is depicted in FIG. 14C for a further embodiment of a handheld screening device 1450, the area of an antenna array 1460 in "cross-shape" form, as it was discussed in connection with FIGS. 10 and 12, can equally well be divided in a first part 1470 and a second part 1480, which—after folding around the hinge 1440—would result in a smaller area as observed perpendicular to the antenna array 1460.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A handheld screening device comprising:
a two-dimensional 2D multiple input-multiple-output (MIMO) antenna array including a plurality of antennas, the plurality of antennas including a first plurality of antennas of a first size arranged in a first plurality of first rows and first columns and a second plurality of antennas of a second size, which is less than the first size, arranged in a second plurality of second rows and second columns, wherein an outer periphery of the first plurality of antennas is within a width between two of the second rows and two of the second columns;
an input mechanism configured to select an operation mode from at least a first operation mode, a second operation mode and a third operation mode;
a processor configured to determine a group of antennas of the plurality of antennas, wherein the number of antennas in the group is based on the selected operation mode, and to control the group of antennas to emit or to receive electromagnetic waves, wherein
the number of antennas included in the group is a first number of antennas when the first operation mode is selected,
the number of antennas included in the group is a second number of antennas, which is greater than the first number of antennas, when the second operation mode is selected, and
the number of antennas included in the group is a third number of antennas, which is greater than the second number of antennas, when the third operation mode is selected; and
the processor is further configured to determine one or more processed layers, wherein the one or more processed layers are based on the selected operation mode, wherein
the one or more processed layers is a single layer when the first operation mode is selected,
the one or more processed layers is a default number of layers, which is greater than the single layer, when the second operation mode is selected, and
the one or more processed layers are all received layers, which is greater than the default number of layers, when the third operation mode is selected.

2. The handheld screening device according to claim 1, wherein the processor is further configured to determine a number of distances between the handheld screening device and one or more objects based on the selected operation mode.

3. The handheld screening device according to claim 1, wherein the processor is further configured to control a transmission power of the antennas based on the selected operation mode.

4. The handheld screening device according to claim 1, wherein the processor is further adapted to adjust a spatial granularity based on the selected operation mode.

5. The handheld screening device according to claim 1, further comprising a housing, and a further single antenna element that is attachable to the housing.

6. The handheld screening device according to claim 1, wherein the antenna array is divided in two parts or more parts that are connected by a hinge.

7. A method for operating a handheld screening device that includes a two-dimensional 2D multiple input-multiple-output (MIMO) antenna array with a plurality of antennas to emit electromagnetic waves, the plurality of antennas including a first plurality of antennas of a first size arranged in a first plurality of first rows and first columns and a second plurality of antennas of a second size, which is greater than the first size, arranged in a second plurality of second rows and second columns, wherein an outer periphery of the first plurality of antennas is within a width between two of the second rows and two of the second columns, the method comprising:
selecting an operation mode from at least a first operation mode, a second operation mode and a third operation mode,
determining a group of antennas of the plurality of antennas, wherein the number of antennas in the group is based on the selected operation mode,
emitting electromagnetic waves from the determined group of antennas or receiving electromagnetic waves from the determined group of antennas, wherein
the number of antennas included in the group is a first number of antennas when the first operation mode is selected,
the number of antennas included in the group is a second number of antennas, which is greater than the first number of antennas, when the second operation mode is selected, and
the number of antennas included in the group is a third number of antennas, which is greater than the second number of antennas, when the third operation mode is selected; and
determining one or more processed layers, wherein the one or more processed layers are based on the selected operation mode, wherein
the one or more processed layers is a single layer when the first operation mode is selected,
the one or more processed layers is a default number of layers, which is greater than the single layer, when the second operation mode is selected, and
the one or more processed layers are all received layers, which is greater than the default number of layers, when the third operation mode is selected.

8. The method according to claim 7 further comprising:
detecting electromagnetic signals reflected from one or more objects located at one or more distances from the antenna, wherein a number of the distances is based on the selected operation mode.

9. The method according to claim 7, further comprising:
controlling a transmission power of the antennas based on the selected operation mode.

10. The method according to claim 7, further comprising:
adjusting a spatial granularity based on the selected operation mode.

11. The method according to claim 7, further comprising:
selecting an operation mode that only uses one antenna of the plurality of antennas.

12. The handheld screening device according to claim 1, wherein
the first operation mode is a low power operation mode,
the second mode of operation is a standard operating mode, and
the third mode of operation is a high performance mode.

13. The handheld screening device according to claim 1, wherein the processor is configured to:
determine a number of distances between the handheld screening device and one or more objects based on the selected operation mode, and
control the group of antennas to emit electromagnetic waves and to detect electromagnetic signals reflected from the one or more objects located at the determined distances, wherein
the number of distances is a first number of distances when the first operation mode is selected,
the number of distances is a second number of distances, which is greater than the first number of distances, when the second operation mode is selected, and
the number of distances is a third number of distances, which is greater than the second number of distances, when the third operation mode is selected.

14. The handheld screening device according to claim 3, wherein
the transmission power is a first transmission power when the first operation mode is selected,
the transmission power is a second transmission power, which is greater than the first transmission power, when the second operation mode is selected, and
the transmission power is a third transmission power, which is greater than the second transmission power, when the third operation mode is selected.

15. The handheld screening device according to claim 4, wherein
the spatial granularity is a first spatial granularity when the first operation mode is selected,
the spatial granularity is a second spatial granularity, which is greater than the first spatial granularity, when the second operation mode is selected, and
the spatial granularity is a third spatial granularity, which is greater than the second spatial granularity, when the third operation mode is selected.

* * * * *